United States Patent
Lagwa et al.

(10) Patent No.: US 11,428,883 B2
(45) Date of Patent: Aug. 30, 2022

(54) MULTILAYER DROP CABLE WITH OPTICAL FIBER

(71) Applicant: CORNING RESEARCH & DEVELOPMENT CORPORATION, Corning, NY (US)

(72) Inventors: Dorota Lagwa, Lodz (PL); Tomasz Stolarczyk, Swędów (PL)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 0 days.

(21) Appl. No.: 17/308,157

(22) Filed: May 5, 2021

(65) Prior Publication Data
US 2021/0356685 A1  Nov. 18, 2021

Related U.S. Application Data

(60) Provisional application No. 63/024,575, filed on May 14, 2020.

(51) Int. Cl.
*G02B 6/44* (2006.01)
(52) U.S. Cl.
CPC ........ *G02B 6/4402* (2013.01); *G02B 6/443* (2013.01); *G02B 6/4436* (2013.01); *G02B 6/4432* (2013.01); *G02B 6/4492* (2013.01); *G02B 6/4495* (2013.01)
(58) Field of Classification Search
CPC .... G02B 6/4402; G02B 6/443; G02B 6/4432; G02B 6/4436; G02B 6/4492; G02B 6/4495
See application file for complete search history.

(56) References Cited

U.S. PATENT DOCUMENTS 5,148,509 A * 9/1992 Kannabiran ......... G02B 6/4432
                                                                385/113
5,371,824 A * 12/1994 Parris .................. G02B 6/4401
                                                                525/212

(Continued)

FOREIGN PATENT DOCUMENTS

| EP | 0510255 A1 | 10/1992 |
|----|-----------|---------|
| EP | 2128670 A2 | 12/2009 |
| WO | 2009/091243 A1 | 7/2009 |

OTHER PUBLICATIONS

European Patent Application No. 21172280.6, Partial European Search Report dated Oct. 7, 2021; 11 pages; European Patent Office.

(Continued)

*Primary Examiner* — Ryan A Lepisto
(74) *Attorney, Agent, or Firm* — William D. Doyle

(57) ABSTRACT

Embodiments of the disclosure relate to an optical fiber cable. The optical fiber cable includes a cable jacket having an inner surface and an outer surface in which the inner surface defines a central bore along a longitudinal axis of the optical fiber cable and the outer surface defines the outermost extent of the cable. One or more embodiments of the cables described herein have improved bending characteristics and performances, respond positively to thermal cycling tests, provide improved anti-buckling characteristics, and have a reduced production cost compared to other known cables.

20 Claims, 5 Drawing Sheets

(56) References Cited

U.S. PATENT DOCUMENTS

| | | | | |
|---|---|---|---|---|
| 5,408,561 A * | 4/1995 | McCallum, III | G02B 6/441 | |
| | | | 385/109 | |
| 6,253,012 B1 * | 6/2001 | Keller | G02B 6/4494 | |
| | | | 385/103 | |
| 6,374,023 B1 * | 4/2002 | Parris | G02B 6/4492 | |
| | | | 385/100 | |
| 6,748,146 B2 * | 6/2004 | Parris | G02B 6/4492 | |
| | | | 385/109 | |
| 7,006,740 B1 * | 2/2006 | Parris | G02B 6/441 | |
| | | | 385/109 | |
| 7,778,511 B1 * | 8/2010 | Bradley | G02B 6/4432 | |
| | | | 385/100 | |
| 7,817,892 B2 * | 10/2010 | Konstadinidis | G02B 6/4402 | |
| | | | 385/128 | |
| 8,582,942 B1 * | 11/2013 | Burnett | G02B 6/4434 | |
| | | | 385/103 | |
| 8,705,921 B2 * | 4/2014 | Blazer | G02B 6/4432 | |
| | | | 385/102 | |
| 8,737,786 B1 | 5/2014 | Compton et al. | | |
| 8,750,665 B2 * | 6/2014 | Testu | G02B 6/4495 | |
| | | | 385/128 | |
| 9,669,592 B2 * | 6/2017 | Blazer | G02B 6/4432 | |
| 9,964,711 B1 * | 5/2018 | Pacini | G02B 6/4402 | |
| 10,261,278 B1 * | 4/2019 | Murthy | G02B 6/4434 | |
| 10,481,359 B2 * | 11/2019 | Murthy | G02B 6/4403 | |
| 10,558,006 B2 * | 2/2020 | Messer | G02B 6/4402 | |
| 10,641,982 B1 * | 5/2020 | Kumar | G02B 6/4429 | |
| 10,809,477 B2 * | 10/2020 | Bringuier | G02B 6/4433 | |
| 11,016,256 B2 * | 5/2021 | Sirin | G02B 6/4488 | |
| 11,256,052 B2 * | 2/2022 | Heinz | G02B 6/441 | |
| 11,262,521 B1 * | 3/2022 | Kachmar | G02B 6/4494 | |
| 2004/0240806 A1 * | 12/2004 | Lail | G02B 6/4486 | |
| | | | 385/100 | |
| 2008/0279514 A1 * | 11/2008 | Kundis | G02B 6/4402 | |
| | | | 385/113 | |
| 2013/0084047 A1 * | 4/2013 | Baucom | G02B 6/4494 | |
| | | | 29/514 | |
| 2020/0271880 A1 * | 8/2020 | Bringuier | G02B 6/4436 | |

OTHER PUBLICATIONS

European Patent Application No. 21172280.6, Extended European Search Report, dated Dec. 15, 2021; 12 pages; European Patent Office.

* cited by examiner

MULTILAYER DROP CABLE WITH OPTICAL FIBER

CROSS-REFERENCE TO RELATED APPLICATIONS

This application claims the benefit of priority under 35 U.S.C. § 119 of U.S. Provisional Application Ser. No. 63/024,575, filed May 14, 2020, the content of which is relied upon and incorporated herein by reference in its entirety.

BACKGROUND

The disclosure relates generally to communication cables and more particularly to an optical fiber drop cable that have improved performance characteristics. Communication cables have seen increased use in a wide variety of electronics and telecommunications fields. Communication cables contain or surround one or more communication fibers. The cable provides structure and protection for the communication fibers within the cable.

SUMMARY

In one aspect, embodiments of the disclosure relate to an optical fiber cable that includes a jacket, a yarn layer within the jacket, a buffer tube within the yarn layer, the buffer tube defining a central bore, a filling compound within the central bore, and an optical fiber within the filling compound. The jacket has a first outer surface defining an outermost surface of the optical fiber cable. The jacket extends in a longitudinal direction from a first end to a second end and includes a fire-resistant, non-corrosive polymer material. The yarn layer extends between the first end and the second end of the jacket. The yarn layer includes a plurality of glass yarn strands and a plurality of aramid yarn strands. The buffer tube includes an inner surface that defines the central bore, which extends in the longitudinal direction between the first end and the second end of the jacket. In a specific embodiment the filling compound is a gel. The optical fiber extends in the longitudinal direction between the first end and the second end of the jacket. The optical fiber includes a glass core, a cladding layer surrounding the glass core and a polymer coating surrounding the cladding layer. An outer diameter of the optical fiber measured at the polymer coating is between 0.19 mm and 0.33 mm.

In another aspect, embodiments of the disclosure relate to an optical fiber cable that includes a jacket, a discontinuity formed within the jacket that provides a weakness within the jacket, a yarn layer circumferentially within the jacket, a buffer tube within the yarn layer, the buffer tube defining a central bore, a filling compound within the central bore, and an optical fiber within the filling compound. The jacket has an outer surface that defines an outermost surface of the optical fiber cable. The jacket extends in a longitudinal direction from a first end to a second end and includes a fire-resistant, non-corrosive polymer material. The yarn layer extends in the longitudinal direction between the first end and the second end of the jacket and includes a plurality of glass yarn strands and a plurality of aramid yarn strands. The buffer tube includes an inner surface that defines the central bore, which extends in the longitudinal direction between the first end and the second end of the jacket. The buffer tube includes a polycarbonate (PC) layer and a polybutylene terephthalate (PBT) layer, with the PC layer surrounding the PBT layer. The filling compound includes at least one of an SAP powder and a gel comprising a composition that includes an SAP powder. The optical fiber extends in a longitudinal direction between the first end and the second end of the jacket. The optical fiber cable defines an outer diameter less than 5.6 mm, and the buffer tube defines an outer diameter that is less than 1.43 mm.

In another aspect, a method of manufacturing an optical fiber cable includes unspooling a central core from a spool, forming a yarn layer around the central core, and extruding a jacket layer around the yarn layer. The central core includes a buffer tube that defines a central bore, an optical fiber within the buffer tube, and a filling compound within the central bore. The filling compound includes at least one of an SAP powder and a gel including a composition with an SAP powder. The yarn layer includes a plurality of glass yarn strands and a plurality of aramid yarn strands. The jacket layer includes a fire-resistant, non-corrosive polymer material and defines an outer diameter less than 5.4 mm.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring generally to the figures, various embodiments of optical fiber cables, such as an optical fiber drop cable, that may be used for optical fiber communication applications, such as fiber-to-the-home (FTTH) installations, are disclosed that provide a variety of improved performance, handling and manufacturing characteristics. For FTTH installations, a drop cable commonly forms the final external link between the subscriber and the feeder cable.

One or more embodiments of the optical fiber cables described herein, such as may be used as drop cables in FTTH installations, protect against micro-bending and macro-bending losses, permit improved bending performances (e.g., 30 mm radius bends such as according to IEC 60794-1-21), exhibit a very low thermal contraction, provide improved anti-buckling characteristics to reduce and/or prevent cable shrinking, satisfy the safety regulations relating to fire tests, have a significantly lower production costs compared to other known cables, have very good results when tested for thermal variations, and/or are easily repeatedly strippable to 100 cm of a protective buffer within the cable. Applicant has observed that one or more of the designs described herein provide a combination of one or more of these benefits that are not exhibited by current cable designs.

Figure 3:
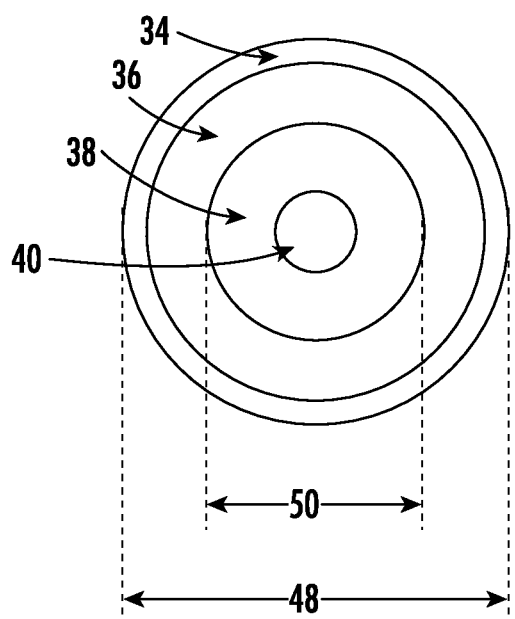
FIG. 3 depicts a detailed view of a portion of the cross-section of FIG. 2, according to an embodiment.
Figure 4:
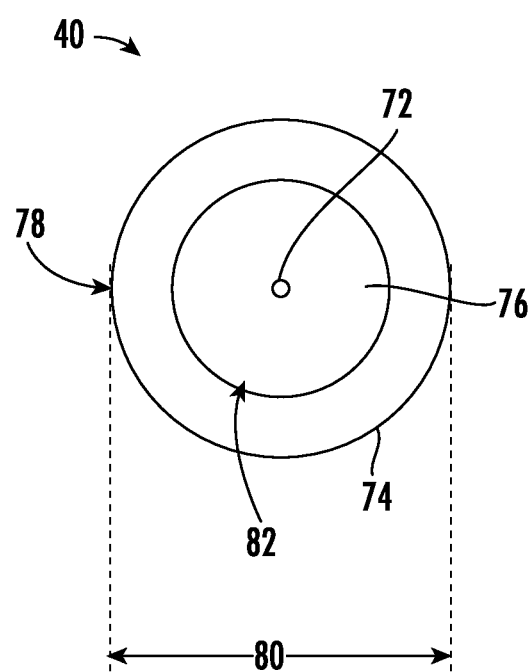
FIG. 4 depicts a detailed view of a portion of the optical communication element of FIG. 3, according to an embodiment.

Turning to FIGS. 1-4, FIGS. 1-2 depict a first embodiment of an optical fiber cable, shown as cable 10, FIG. 3 depicts a detailed cross-sectional view of a portion of cable 10, and FIG. 4 depicts a detailed cross-sectional view of optical communication element 40. The cable 10 includes a cable jacket 12 having an inner surface 14 and an outer surface 16. The inner surface 14 defines a central bore 18, and the outer surface 16 defines an outermost extent, shown as outer surface 42, of the cable 10. Cable 10 extends from a first end 44 to a second end 46.

In a specific embodiment, outer diameter 52 of cable 10 is between 3.3 mm and 5.6 mm, and more specifically between 3.6 mm and 5.2 mm, and more specifically between 3.9 mm and 4.7 mm, and even more specifically is 4.3 mm.

In embodiments, the cable jacket 12 comprises a low smoke, zero halogen (LSZH) or flame retardant, non-corrosive (FRNC) composition. In certain embodiments, the cable jacket 12 is comprised of a flame retardant additive dispersed, mixed, or otherwise distributed in a polymeric resin. In embodiments, the polymeric resin is a thermoplastic, and in a more specific embodiment, the thermoplastic is a polyolefin-based resin. Polymer resins that may be used for the cable jacket 12 include a single polymer or a blend of polymers selected from the following non-limiting list: ethylene-vinyl acetate copolymers, ethylene-acrylate copolymers, ethylene homopolymers (including but not limited to low density, medium density, and high density), linear low density polyethylene, very low density polyethylene, polyolefin elastomer copolymer, propylene homopolymer, polyethylene-polypropylene copolymer, butene- and octene branched copolymers, polyester copolymers, polyethylene terephthalates, polybutylene therephthalates, other polymeric terephthalates, and maleic anhydride-grafted versions of the polymers listed herein. As mentioned, the cable jacket 12 includes at least one flame retardant additive. Exemplary flame retardant additives include aluminum trihydrate (ATH), magnesium hydroxide (MDH), ammonium polyphosphate (APP), pentaerythritol (PER), antimony oxides, zinc borates, boehmite, intumescent materials, and red phosphorous, among others.

Figure 1:
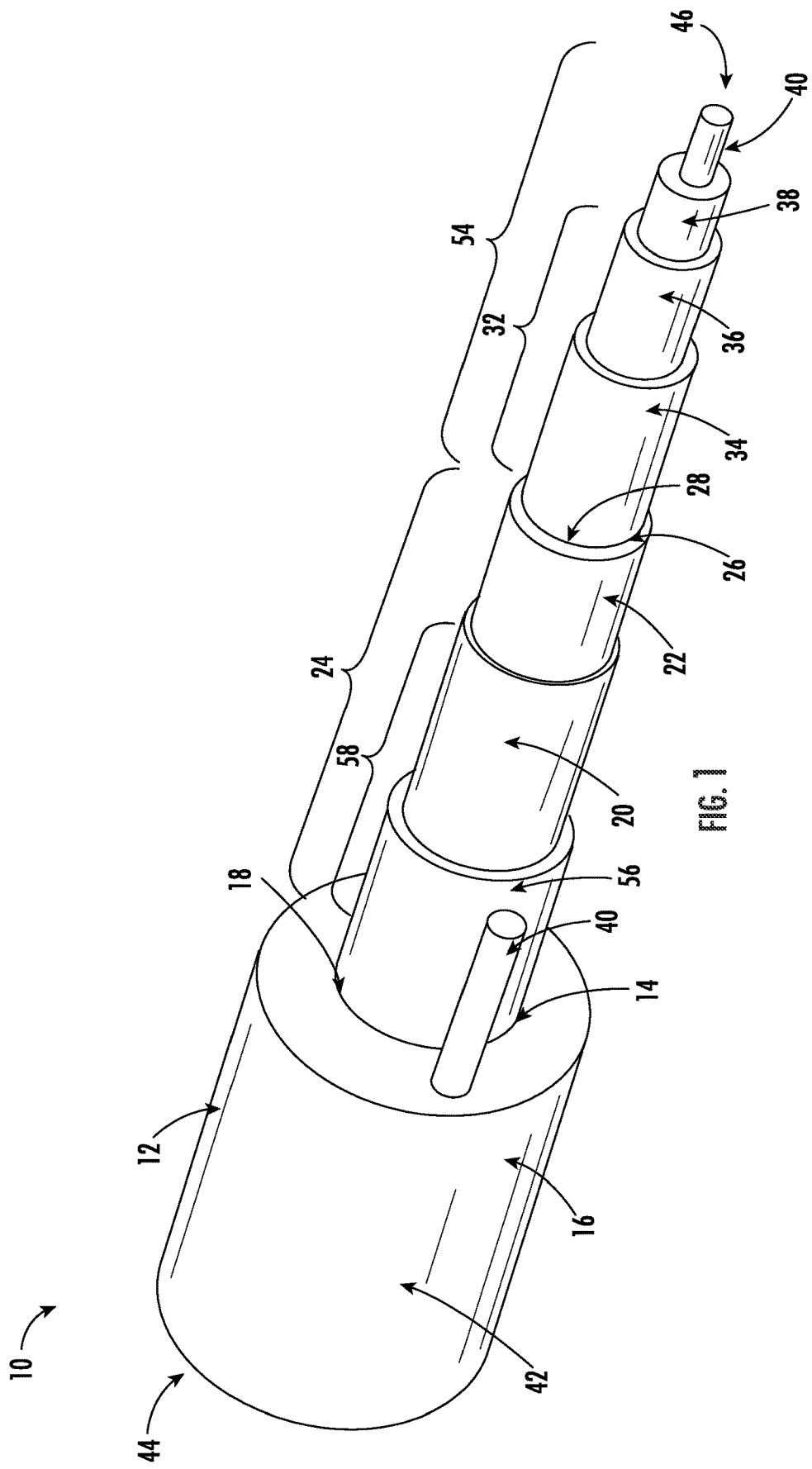
FIG. 1 depicts an optical fiber cable, according to an exemplary embodiment.
Figure 2:
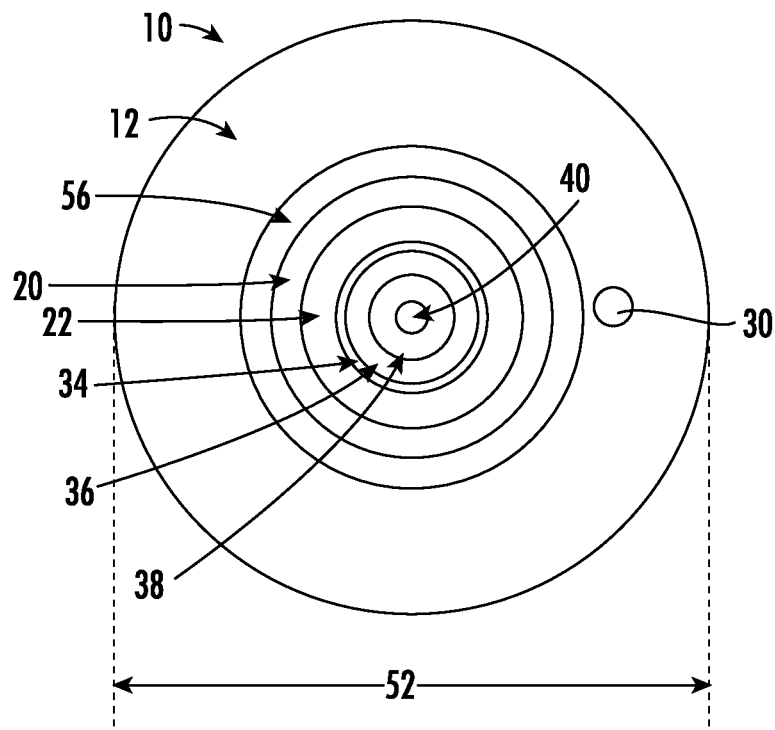
FIG. 2 depicts a cross-section of the optical fiber cable of FIG. 1, according to an embodiment.

Further, in embodiments, the cable jacket 12 includes an access feature 30, such as a ripcord or strip of polymer material that is dissimilar from the material of the cable jacket 12 (e.g., polypropylene strip in a predominantly polyethylene jacket). In embodiments, the ripcord is a yarn comprised of at least one of a textile fiber (e.g., at least one of glass fibers, aramid fibers, cotton fibers, or carbon fibers, among others), a nylon, liquid crystal polymer fibers, or PET polyester fibers, among others. As can be seen in the embodiment of FIG. 1, jacket 12 includes two access features 30, but it is contemplated herein that jacket 12 may include one access feature 30 or two or more access features 30, such as up to four access features 30, which may be evenly spaced around jacket 12.

Disposed within the central bore 18 are tensile strength elements/material, shown as aramid layer 58 and glass layer 22, which are collectively referred to as yarn layer 24. In various embodiments aramid layer 58 includes one or more aramid yarns and glass layer 22 includes one or more glass yarns. In various embodiments glass layer 22 is internal to aramid layer 58. In one specific embodiment the glass layer 22 has antibuckling properties. Interior surface 26 of yarn layer 24, which in FIG. 1 is also the interior surface of yarn layer 24, defines an inner bore 28. In one specific embodiment, aramid layer 58 is a single layer of aramid yarns. In another specific embodiment aramid layer 58 includes two layers, inner aramid layer 20 and outer aramid layer 56, which collectively define aramid layer 58.

Disposed within inner bore 28 is buffer tube 32. In various embodiments buffer tube 32 is a composition that includes polycarbonate (PC) and/or polybutylene terephthalate (PBT). In a specific embodiment, buffer tube 32 includes a PBT layer 34 that surrounds a PC layer 36, with the PBT layer 34 being made of a composition that includes PBT, and the PC layer 36 being made of a composition that includes PC. In a specific embodiment, buffer tube 32 comprises a single layer made of a composition that includes both PC and PBT.

Applicant has observed that the combination of the yarn layer 24 and the buffer tube 32 functions as an anti-buckling element in cable 10, to further protect against signal attenuation, such as due to thermal variations.

In a specific embodiment, outer diameter 48 of buffer tube 32 is between 0.85 mm and 1.43 mm, and more specifically is between 0.92 mm and 1.32 mm, and more specifically is between 1 mm and 1.21 mm, and more specifically is 1.1 mm. In a specific embodiment inner diameter 50 of buffer tube 32 is between 0.46 mm and 0.78 mm, and more specifically is between 0.5 mm and 0.72 mm, and more specifically is between 0.55 mm and 0.66 mm, and more specifically is 0.6 mm. In a specific embodiment the inner diameter 50 is between 42% and 71% of the length of outer diameter 48, and more specifically is between 45% and 65%, and more specifically is between 50% and 60%, and more specifically inner diameter 50 is 55% the length of outer diameter 48.

A filling compound 38 is within buffer tube 32, and a communication medium, shown as optical communication element 40, is within filling compound 38. In a specific embodiment filling compound 38 includes a gel (e.g., a thixotropic compound) that includes a superabsorbent polymer (SAP) powder. In another specific embodiment, filling compound 38 includes at least one of an SAP powder and/or a gel made of a composition that includes an SAP. Collectively buffer tube 32, filling compound 38, and optical communication element 40 define core 54 of cable 10 (best shown in FIG. 3).

In an embodiment, optical communication element 40 includes a fiber optic element, such as optical fibers. The optical fibers discussed herein include optical fibers that are flexible, transparent optical fibers made of glass or plastic. The fibers function as a waveguide to transmit light between the two ends of the optical fiber. Optical fibers include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used.

Turning to FIG. 4, In the embodiment shown, optical communication element 40 includes a central portion 82 that includes an optically transmitting optical core 72 and a cladding layer 76. Optical communication element 40 also includes a coating layer 74. Coating layer 74 surrounds both optical core 72 and cladding layer 76. In particular, coating layer 74 has an inner surface that contacts and is bonded to the outer surface of cladding layer 76. Coating layer 74 also has an outer surface 78 that defines the outer or exterior surface of optical communication element 40. In the embodiment shown, coating layer 74 is a single layer formed from a single material that provides protection (e.g., protection from scratches, chips, etc.) to optical communication element 40. In various embodiments, coating layer 74 may be a UV curable acrylate material applied to the outside of the optical fiber during the drawing process, and may have a thickness between 10 μm and 100 μm. In various embodiments, the optical fibers may be bend insensitive optical fibers or multi-core optical fibers.

In a specific embodiment, optical communication element 40 is not tight-buffered (bare) and has a diameter 80 between 0.19 mm and 0.33 mm, and more specifically between 0.21 mm and 0.3 mm, and more specifically between 0.23 mm and 0.28 mm, and more specifically is 0.25. In another specific embodiment cable 10 includes between one and four, inclusively, fiber optic elements, which are bare (e.g., not tight-buffered). In another specific embodiment optical communication element 40 is not tight-buffered (bare) and has a diameter 80 between 150 μm and 250 μm, and more specifically between 180 μm and 220 μm, and more specifically is 200 μm.

Figure 5:
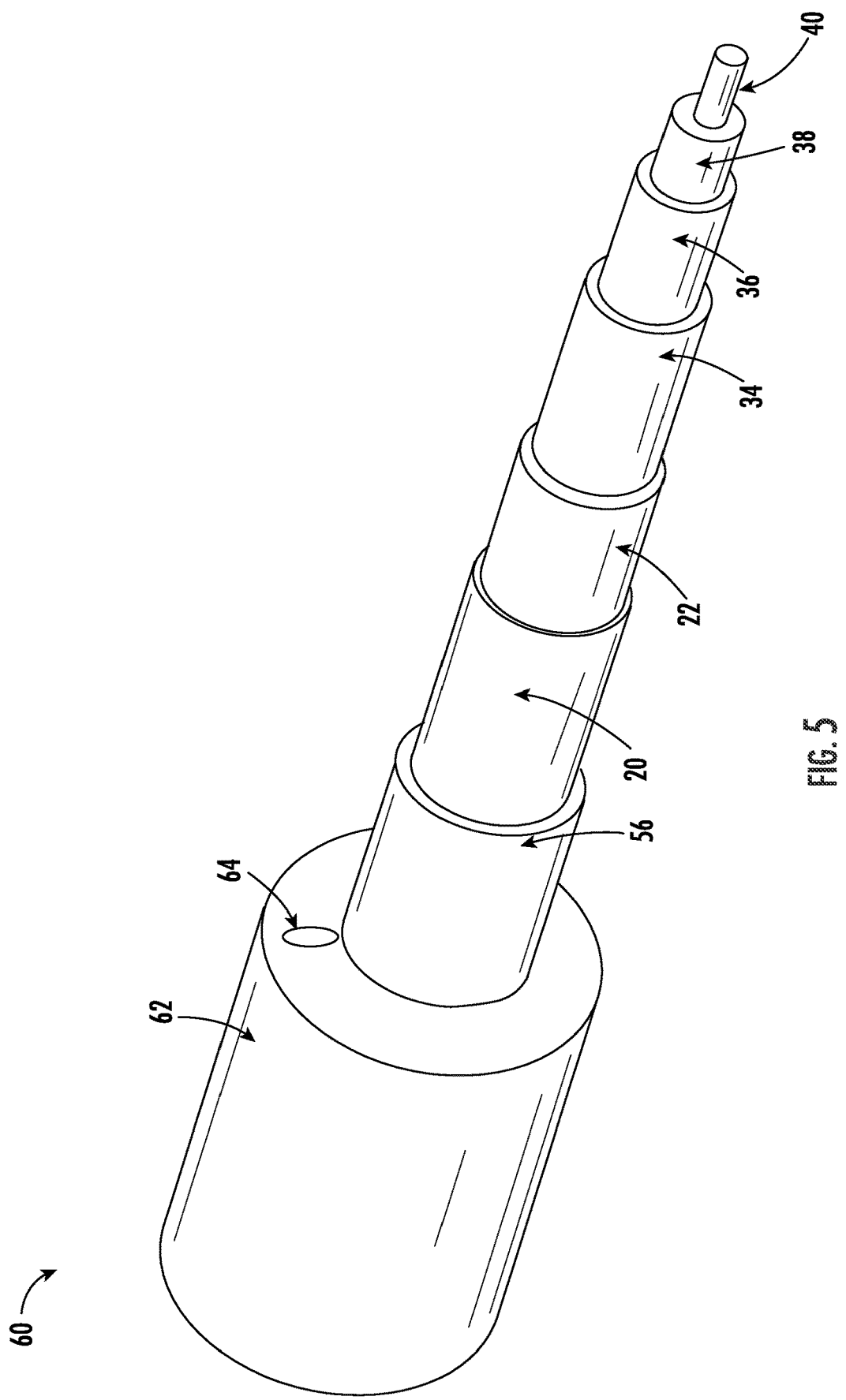
FIG. 5 depicts an optical fiber cable, according to an exemplary embodiment.
Figure 6:
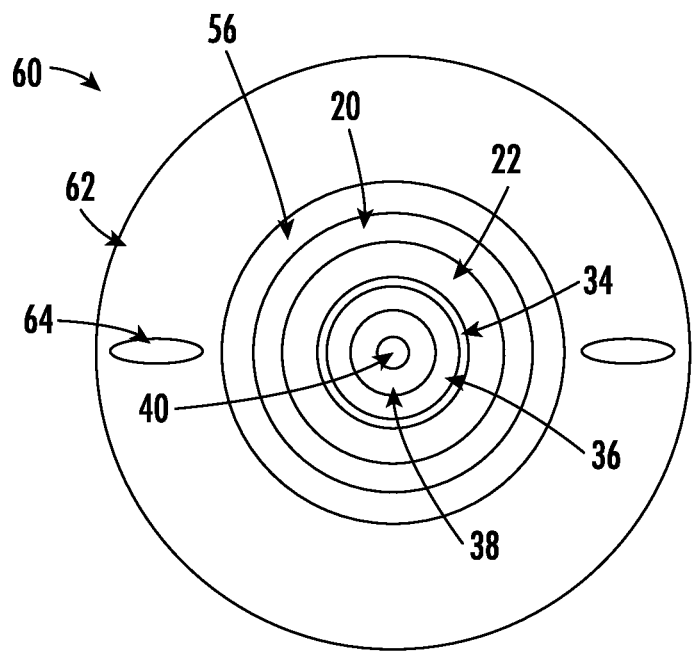
FIG. 6 depicts a cross-section of the optical fiber cable of FIG. 5, according to an embodiment.

FIGS. 5-6 depict another embodiment of a cable 60. As can be seen in FIGS. 5-6, the construction of the cable 60 is substantially similar to cable 10 shown in FIG. 1 except as described herein.

Cable 60 includes jacket 62. Jacket 62 includes one or more discontinuities 64 that provides a weakness within jacket 62. As a result of discontinuity 64, jacket 62 can be removed from yarn layer 24 by a user without the use of special tools. The discontinuities 64 are bonded to the primary portion of the jacket 62 when the jacket is extruded. The primary portion of the jacket 62 and the discontinuities 64 can be formed from extrudable polymers, so that as the two extrudate materials used to form the jacket 62 and the discontinuities 64 cool and solidify, the extrudates become bonded to a desired degree. When the discontinuities 64 are formed while extruding the primary portion of the jacket 62, the bond between the discontinuity 64 and the remainder of the jacket 62 can be generally described as enabled by polymer chain entanglement as the jacket 62 solidifies. The degree of bonding can be selected to provide desirable separation properties at the discontinuities 64. The jacket 62 can accordingly comprise a cohesive, unitary, composite polymeric structure. A discontinuity can be extruded into the primary portion of the jacket 62 at any location where a point of access might be formed. In the illustrated embodiment, the discontinuities 64 are located on opposite sides of the annular jacket 62 to that the jacket can be torn in half and pulled away. Both discontinuities 64 are wholly embedded or surrounded by the primary portion of the jacket 62.

Figure 7:
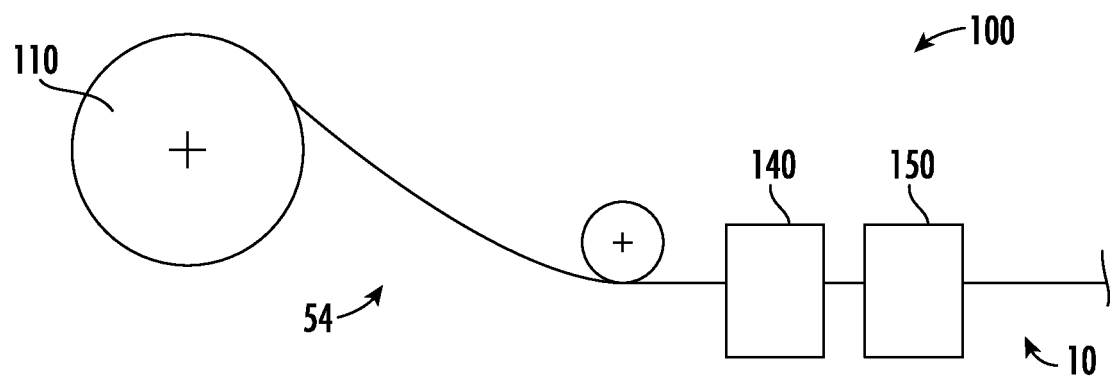
FIG. 7 depicts a method of manufacturing the optical fiber cable of FIG. 1.

Turning to FIG. 7, depicted therein is a method 100 of manufacturing cable 10. Core 54 is unspooled from spool 110. In a specific embodiment, core 54 includes buffer tube 32 surrounding filling compound 38, and optical communication element 40 within filling compound 38. In various embodiment optical communication element 40 is not tight-buffered. Applicant has observed that using an optical communication element 40 that is not tight-buffered permits a quicker and more efficient manufacturing process, and also results in a cable 10 that is easier to use in the field. For example, when cable 10 is cut at a first end 44, more of optical communication element 40 can be retrieved from first end 44 when optical communication element 40 is not tight-buffered (e.g., up to two meters from the cable) compared to if optical communication element 40 is tight-buffered (e.g., only up to one meter from the cable). At station 140, yarn layer 24 is formed around core 54, and at station 150, jacket 12 is extruded over yarn layer 24, resulting in cable 10.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable comprising:
a jacket having a first outer surface defining an outermost surface of the optical fiber cable, the jacket extending in a longitudinal direction from a first end to a second end, the jacket comprising a non-corrosive polymer material;
a yarn layer located within the jacket and extending in the longitudinal direction between the first end and the second end of the jacket, the yarn layer comprising a plurality of glass yarn strands and a plurality of aramid yarn strands;
a buffer tube located within the yarn layer, the buffer tube comprising an inner surface, the inner surface defining a central bore extending in the longitudinal direction between the first end and the second end of the jacket;
a filling compound within the central bore, wherein the filling compound is a gel; and
an optical fiber located within the gel and extending in the longitudinal direction between the first end and the second end of the jacket, wherein the optical fiber comprises a glass core, a cladding layer surrounding the glass core and a polymer coating surrounding the cladding layer, wherein an outer diameter of the optical fiber measured at the polymer coating is between 0.19 millimeters and 0.33 millimeters.

2. The optical fiber cable of claim 1, wherein the yarn layer comprises:
an aramid layer that comprises the plurality of aramid yarn strands; and
a glass layer that comprises the plurality of glass yarn strands, wherein the glass layer surrounds the buffer tube and the aramid layer surrounds the glass layer.

3. The optical fiber cable of claim 1, wherein the buffer tube comprises:
a polycarbonate (PC) layer; and
a polybutylene terephthalate (PBT) layer having an inner surface defining the central bore of the buffer tube, wherein the PC layer surrounds the PBT layer and defines an outer surface of the buffer tube.

4. The optical fiber cable of claim 1, wherein the buffer tube defines an outer diameter that is less than 1.32 millimeters.

5. The optical fiber cable of claim 4, wherein the buffer tube defines an inner diameter that is between 42% and 71% of the outer diameter.

6. The optical fiber cable of claim 1, wherein the optical fiber cable defines an outer diameter that is less than 5.6 mm.

7. The optical fiber cable of claim 1, further comprising a plurality of optical fibers.

8. The optical fiber cable of claim 1, wherein the optical fiber cable defines an outer diameter less than 5.6 millimeters, and wherein the buffer tube defines an outer diameter that is less than 1.43 millimeters.

9. The optical fiber cable of claim 1, wherein the gel comprises a superabsorbent polymer (SAP) powder.

10. An optical fiber cable comprising:
a jacket having an outer surface defining an outermost surface of the optical fiber cable, the jacket extending in a longitudinal direction from a first end to a second end, the jacket comprising a fire-resistant, non-corrosive polymer material;
a discontinuity formed within the jacket;
a yarn layer within the jacket and extending in the longitudinal direction between the first end and the second end of the jacket, the yarn layer comprising a plurality of glass yarn strands and a plurality of aramid yarn strands;
a buffer tube located within the yarn layer, the buffer tube comprising an inner surface, the inner surface defining a central bore extending in the longitudinal direction between the first end and the second end of the jacket, wherein the buffer tube comprises a polycarbonate (PC) layer and a polybutylene terephthalate (PBT) layer, wherein the PC layer surrounds the PBT layer;
a filling compound within the central bore, the filling compound comprising at least one of a superabsorbent polymer (SAP) powder and a gel comprising a a superabsorbent polymer (SAP) powder; and
an optical fiber located within the filling compound and extending in the longitudinal direction between the first end and the second end of the jacket;
wherein the optical fiber cable defines an outer diameter less than 5.6 millimeters, and wherein the buffer tube defines an outer diameter that is less than 1.43 millimeters.

11. The optical fiber cable of claim 10, wherein the optical fiber comprises a glass core and polymer coating a surrounding the optical fiber, wherein an outer diameter of the optical fiber measured at the polymer coating is between 0.19 millimeters and 0.33 millimeters.

12. The optical fiber cable of claim 11, wherein the buffer tube defines an inner diameter that is between 42% and 71% of the outer diameter of the buffer tube.

13. The optical fiber cable of claim 10, wherein the yarn layer comprises:
an aramid layer that comprises the plurality of aramid yarn strands; and
a glass layer that comprises the plurality of glass yarn strands, wherein the glass layer surrounds the buffer tube and the aramid layer surrounds the glass layer.

14. The optical fiber cable of claim 10, further comprising a plurality of optical fibers each comprising a glass core, a cladding layer surrounding the glass core and a polymer coating surrounding the cladding layer, wherein an outer diameter of the plurality of optical fiber measured at the polymer coating is between 0.19 millimeters and 0.33 millimeters.

15. A method of manufacturing an optical fiber cable, the method comprising:
unspooling a central core from a spool, wherein the central core comprises:
a buffer tube that defines a central bore;
an optical fiber within the buffer tube; and
a filling compound within the central bore, the filling compound comprising at least one of an superabsorbent polymer (SAP) powder and a gel comprising a superabsorbent polymer (SAP) powder;
forming a yarn layer around the central core, the yarn layer comprising a plurality of glass yarn strands and a plurality of aramid yarn strands; and
extruding a jacket layer around the yarn layer, the jacket layer comprising a fire-resistant, non-corrosive polymer material, the jacket layer defining an outer diameter less than 5.4 millimeters.

16. The method of claim 15, wherein the optical fiber is between one and four optic fibers, inclusively, and wherein the optical fibers of the one to four optical fibers comprise a glass core, a cladding layer surrounding the glass core and a polymer coating surrounding the cladding layer, wherein an outer diameter of the optical fiber measured at the polymer coating is between 0.19 mm and 0.33 mm.

17. The method of claim 15, wherein the step of forming the yarn layer comprises:
forming a glass layer immediately surrounding the buffer tube, wherein the glass layer comprises the plurality of glass yarn strands; and
forming an aramid layer immediately surrounding the glass layer, wherein the aramid layer comprises the plurality of aramid yarn strands.

18. The method of claim 15, wherein the jacket layer defines an interior surface and an exterior surface, and wherein the jacket layer comprises an access feature between the interior surface and the exterior surface.

19. The method of claim 15, wherein the buffer tube comprises a polycarbonate (PC) layer and a polybutylene terephthalate (PBT) layer, and wherein the PC layer surrounds the PBT layer.

20. The method of claim 15, wherein the buffer tube comprises a composition that includes PBT, and wherein the layer between the filling compound and the yarn layer, which includes the buffer tube, does not include a composition that includes polycarbonate (PC).

* * * * *